(No Model.)
C. J. DANIELS.
LIGATURE RECEPTACLE.
No. 562,173. Patented June 16, 1896.
Fig. 1
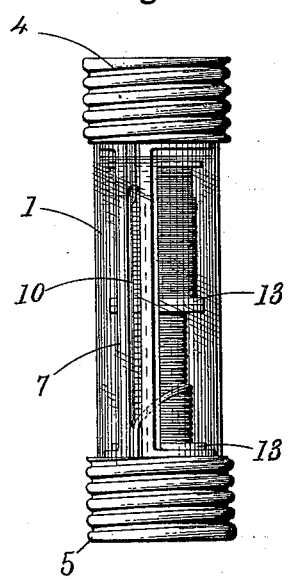
Fig. 2
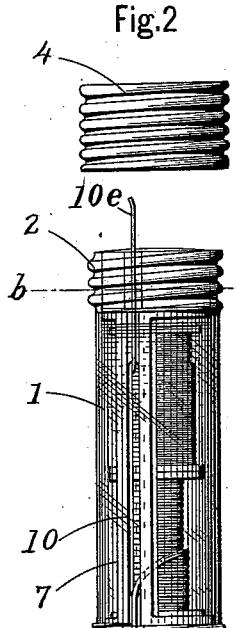
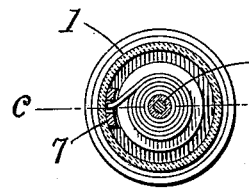
Fig. 3
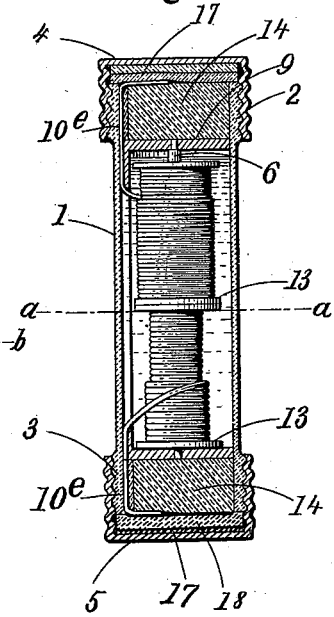
Fig. 4. Fig. 5.
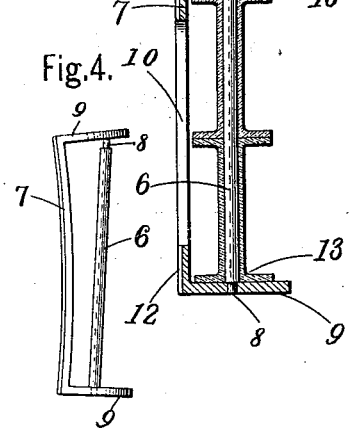
Fig. 6
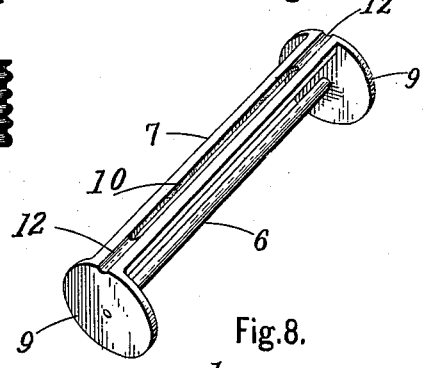
Fig. 7. Fig. 8.
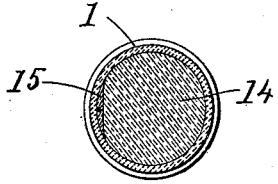
Witnesses.
L. M. Spong.
Emil Neuhart.
Charles J. Daniels, Inventor.
By James Sangster, Attorney.

UNITED STATES PATENT OFFICE.

CHARLES J. DANIELS, OF BUFFALO, NEW YORK.

LIGATURE-RECEPTACLE.

SPECIFICATION forming part of Letters Patent No. 562,173, dated June 16, 1896.

Application filed June 10, 1895. Serial No. 552,225. (No model.)

*To all whom it may concern:*

Be it known that I, CHARLES J. DANIELS, a citizen of the United States, residing in Buffalo, in the county of Erie and State of New York, have invented certain new and useful Improvements in Suture or Ligature Tubes, of which the following is a specification.

My invention relates to an improved device for holding surgeons' silk, catgut or any suitable material of that class, and will be fully and clearly hereinafter described and claimed, reference being had to the accompanying drawings, in which—

Figure 1 represents a side elevation of my device. Fig. 2 is also a side elevation showing the screw caps or covers removed a short distance from the ends of the tube. Fig. 3 is a longitudinal central section on or about line *c c*, Fig. 7, through the device. Fig. 4 is a detached detail view of the spindle or spool-carrying shaft, and its supporting-frame, illustrating the manner in which the shaft is removed from the frame. Fig. 5 is a central section in or about line *c c*, Fig. 7, through the supporting-frame and the spools mounted on the shaft, cutting also through the guiding-slot in the supporting-frame, all other portions of the device being omitted. Fig. 6 is a detached perspective view of the shaft and its supporting-frame, illustrating also the guiding-slot and the longitudinal guiding-grooves in the supporting-frame. Fig. 7 represents a horizontal section cutting through Fig. 3, on or about line *a a*. Fig. 8 is a horizontal section through line *b b*, Fig. 2.

Referring to the drawings in detail, 1 represents the tube, which is preferably formed of glass. This tube 1 is provided at each of its opposite ends with screw-threaded portions 2 and 3, over which the screw-caps 4 and 5 are adapted to be screwed.

The spindle 6 and its supporting-frame 7 are formed, preferably, of hard rubber, and the spindle is provided at its ends with reduced portions 8, (shown in Fig. 5,) adapted to fit in the central circular openings in the portions 9 of the supporting-frame.

The slot 10 in the supporting-frame is for the purpose of guiding the silk or catgut. It will be noticed that slight longitudinal guiding-grooves 12 are cut in the supporting-frame 7, extending from both sides of the slot to the ends of the frame. These grooves serve the purpose of guiding the silk or catgut from the slot to the openings in the stoppers, a description of which will appear farther on.

The spools 13, upon which the silk or catgut is wound, are preferably formed of glass. These spools are provided with central longitudinal openings through which the shaft or spindle 6 is passed.

The stoppers 14, (see Figs. 3 and 8,) which are used to securely seal each end of the tube 1, are formed of any suitable elastic material, such as rubber, &c. These stoppers 14 are each provided with a thin portion of very soft rubber, rubber dam, for instance, substantially as shown in Fig. 8. These soft-rubber portions, which I designate by the numeral 15, (see Fig. 8,) are located so that the silk or catgut passes from the termination of the slot in a straight direction along the longitudinal guiding-grooves 12 and between the inner surface of the glass tube and the said soft-rubber portions, and as the soft rubber presses very closely against the silk or catgut it practically cleans all the antiseptic fluid therefrom, and of course prevents any leakage.

The screw-caps 4 5 are formed of sheet metal, or any suitable material, and are provided with a rubber packing 17, (see Fig. 3,) which fits between the tubes and the tops of the caps.

When any antiseptic liquid other than alcohol is used that would be injurious to the rubber stoppers 14, and thereby cause a leakage of the material, I use a stopper of glass or other equivalent material 18, ground true (shown in Fig. 3) to fit in or against the correspondingly ground end of the glass tube 1, so as to fit liquid-tight thereon. A washer of india-rubber 17 protects it from being broken when the cap is screwed tightly against it. This construction insures an absolutely tight joint under any conditions, as above mentioned, and is very important when any material which would attack the rubber is combined with the antiseptic fluid. This additional sealing device is designed to be used at both ends of the tube with both caps and stoppers, but in some cases, when one spool only is required to be used, for instance, one end of the tube may be permanently secured and sealed in any well-known way, and the other end only, through which the catgut or silk is drawn, may be sealed by a removable elastic stopper combined with a removable glass stopper 18, substantially as shown in Fig. 3.

The screw-caps being located one at each end of the tube protect it from breaking if accidentally dropped to the floor.

The operation of this device is as follows: Place the spools 13, upon which is wound the required amount of silk, catgut or other suitable material, on the spindle or shaft 6, then spring the spindle in the supporting-frame 7, substantially as shown in Fig. 4. Pass the ends of the silk or catgut 10ᵉ through the slot 10, and then place the supporting-frame, spindle and spools arranged as above described in the tube 1, draw the ends of the silk or catgut far enough to protrude a suitable distance from the ends of the tube, seal one end of the tube with a stopper 14, being sure to place the soft-rubber portion 15 so that the silk or catgut will pass directly between it and the inner surface of the glass tube. Now fill the tube with any suitable antiseptic fluid, alcohol for instance, and close the other end with a stopper 14, observing the same precautions in regard to placing the silk or catgut between the inner surface of the tube and the soft-rubber portion. The screw-caps can now be placed on the ends of the tube. In using this device unscrew one of the caps, take hold of the end of the silk or catgut, and draw out the required length, cut it off and replace the cap.

It will be observed by glancing at Fig. 3 that the main portion of the frame in which the longitudinal slot is cut is at one side of the spools, and that the silk passes through the slot in a substantially straight line along the guiding-grooves and out through between the stoppers and the inner sides of the tube.

The spools carrying the silk or catgut are mounted on the spindle so that if the silk or catgut were drawn from both spools at once they would revolve in different directions. By this means the rotation of one of the spools caused by drawing out a portion of the silk or catgut will not cause the other spool to unwind.

If the spools were mounted on the spindle so that they turn in the same direction, the revolving of one would, as the ends of the spools are in frictional contact, cause the other spool to also revolve and thus unwind and probably tangle or snarl the silk or catgut carried thereon. My way of arranging the spools entirely obviates this disadvantage, as the turning of one cannot turn the other unless the silk is wound loosely thereon, and even then it can only revolve it enough to sufficiently tighten the same, as the portions of the silk or catgut passing between the inner surface of the tube and the soft-rubber portion 15 are held too closely at that point to permit the slight friction caused by the contact of the sides of the spools to draw them inwardly.

My device also possesses many other advantages over those heretofore used for the same purpose, the most important of which are: The material is drawn off from the spools in opposite directions and at opposite ends. The spools are easily removed and rewound when empty. The use of a tube allows the spools and their holding mechanism to be easily removed as no cement is required to secure the stoppers.

It is also simple in construction and easy and certain in operation.

I claim as my invention—

1. A device for holding surgeons' ligatures, consisting of a tube, caps for closing the ends of the said tube, a spindle upon which the spools are mounted, a supporting-frame into which the said spindle is adapted to be sprung, a slot cut in the main portion of the supporting-frame, and terminating in grooves for guiding the materials, and stoppers for sealing each end of the tube, said stoppers being each provided at one side with a thin portion of very soft rubber, substantially as described.

2. A device for holding surgeons' ligatures, consisting of a tube adapted to contain antiseptic fluid, stoppers for sealing the ends of said tube, a spindle upon which are mounted two spools carrying the material, a supporting-frame into which the spindle is adapted to be sprung, said supporting-frame being provided with a slot and grooves for guiding the material from each spool, to the end of the tube nearest to the said spool, and an elastic stopper, between which and the inner surface of the tube, the material is adapted to be drawn, as set forth.

3. In a device for holding surgeons' ligatures, the combination with the tubular portion thereof, of a flexible supporting-frame into which the spool-carrying spindle is sprung, substantially as described.

4. A device for holding surgeons' ligatures, consisting of a glass tube, devices for carrying the material mounted therein, removable elastic stoppers between which and the inner side of the glass tube the material is drawn, supplementary ground-glass stoppers, and caps adjustably secured over the ends of the glass tube the elastic stoppers and the supplementary ground-glass stoppers for hermetically sealing the same.

CHARLES J. DANIELS.

Witnesses:
A. J. SANGSTER,
EMIL NEUHART.